(12) United States Patent
Ushijima et al.

(10) Patent No.: US 8,549,837 B2
(45) Date of Patent: Oct. 8, 2013

(54) EXHAUST APPARATUS FOR TRANSVERSE ENGINE

(75) Inventors: Kenji Ushijima, Hiroshima (JP);
Hirokazu Hasegawa, Higashihiroshima (JP); Yasushi Nakatani, Aki-gun (JP);
Keishi Kitabatake, Hiroshima (JP);
Yasushi Kusunoki, Aki-gun (JP);
Toshiaki Kamo, Hiroshima (JP);
Yoshitaka Nakamura, Hiroshima (JP);
Daisuke Watanabe, Hiroshima (JP);
Hiroki Shimoji, Hatsukaichi (JP);
Masami Negami, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 323 days.

(21) Appl. No.: 12/958,166

(22) Filed: Dec. 1, 2010

(65) Prior Publication Data
US 2011/0126521 A1 Jun. 2, 2011

(30) Foreign Application Priority Data

Dec. 2, 2009 (JP) .................................. 2009-274195

(51) Int. Cl.
*F01N 3/08* (2006.01)

(52) U.S. Cl.
USPC ............................................. 60/282; 60/299

(58) Field of Classification Search
USPC .......................................... 60/323, 282, 299
See application file for complete search history.

(56) References Cited

U.S. PATENT DOCUMENTS

| 5,239,826 A * | 8/1993 | Hirota et al. ..................... 60/302 |
| 6,332,314 B1 * | 12/2001 | Nakade et al. .................. 60/299 |
| 7,350,351 B2 * | 4/2008 | Ueshima et al. ................ 60/299 |
| 2002/0152748 A1 * | 10/2002 | Matsuzawa ..................... 60/323 |

FOREIGN PATENT DOCUMENTS

| JP | S56-113009 A | 9/1981 |
| JP | H5-63639 U | 8/1993 |
| JP | H6-101462 A | 4/1994 |
| JP | 2001-152840 A | 6/2001 |
| JP | 2005-290993 A | 10/2005 |
| JP | 2008-260472 | 10/2008 |

OTHER PUBLICATIONS

Japanese Office Action "Notice of Reasons for Rejection" dated Nov. 8, 2011; Japanese Patent Application No. 2009-274195 with translation.

* cited by examiner

*Primary Examiner* — Thomas Denion
*Assistant Examiner* — Todd Pleiness
(74) *Attorney, Agent, or Firm* — Studebaker & Brackett PC

(57) ABSTRACT

An exhaust upstream section (48) of an exhaust apparatus (E) comprises a plurality of branch pipe portions (32), a plurality of intermediate collector pipe portions (33), a final collector pipe portion (34), and an exhaust gas-purifying unit (40). The exhaust gas-purifying unit (40) is disposed on a vehicle-rear side of an engine (1) to allow a gas passage thereinside to extend approximately in vehicle-widthwise direction, in top plan view. Each of the plurality of intermediate collector pipe portions (33) curves to allow an exhaust downstream region of the intermediate collector pipe portion (33) to be oriented toward one side or the other side of the vehicle-widthwise direction, in top plan view, and the final collector pipe portion (34) curves to allow an exhaust downstream region of the final collector pipe portion (34) to be oriented toward a vehicle-front side, in top plan view.

9 Claims, 11 Drawing Sheets

EXHAUST APPARATUS FOR TRANSVERSE ENGINE

BACKGROUND OF THE INVENTION

1. Field of the Invention

The present invention relates to an exhaust apparatus for a transverse engine which is transversely placed in an engine compartment at a front of a vehicle to allow a cylinder arrangement direction to be oriented in a widthwise direction of the vehicle (vehicle-widthwise direction).

2. Description of the Background Art

Heretofore, this type of transverse engine has been widely known. Typically, an exhaust apparatus for the transverse engine is disposed on a vehicle-rear side of the engine (see, for example, JP 2008-260472A, this document will hereinafter be referred to as "Patent Document 1"). The exhaust apparatus has a plurality of branch pipe portions each communicated with a respective one of a plurality of cylinders of the engine, wherein the branch pipe portions are merged to finally form a single collector pipe portion. Specifically, in the Patent Document 1, the entire cylinders (four cylinders) are divided into a plurality of cylinder groups each consisting of two or more cylinders whose exhaust strokes are not successive with respect to each other (a cylinder group consisting of the first (#1) and fourth (#4) cylinders, and a cylinder group consisting of the second (#2) and third (#3) cylinders), and the branch pipe portions communicated with respective ones of the cylinders in each of the cylinder groups are merged on a cylinder group-by-cylinder group basis to form a plurality of (two) intermediate collector pipe portions. Then, the two intermediate collector pipe portions are merged together to form a final collector pipe portion.

In late years, with a view to reducing exhaust gas emissions during engine warm-up (when an engine is in a cold start mode), an exhaust gas-purifying unit has been provided on a relatively upstream side of an exhaust gas stream to quickly raise a temperature of a catalyst in the exhaust gas-purifying unit. In the Patent Document 1, an exhaust gas-purifying unit (manifold catalytic converter) is provided in each of the intermediate collector pipe portions.

Meanwhile, in view of enhancing engine exhaust efficiency to increase engine output power, it is desirable to maximize a length of each of the branch pipe portions and the intermediate collector pipe portions. From this viewpoint, the exhaust apparatus in the Patent Document 1 is also designed to increase a length of each of the branch pipe portions and the intermediate collector pipe portions. For this purpose, the two intermediate collector pipe portions are disposed inside a tunnel portion formed in a vehicle-widthwise central region of a floor panel.

However, in order to allow the two intermediate collector pipe portions to be disposed inside the tunnel portion, it is necessary to increase width and height dimensions (cross-sectional area) of the tunnel portion. Particularly, in the Patent Document 1, due to the exhaust gas-purifying units provided in the intermediate collector pipe portions, the cross-sectional area of the tunnel portion needs to be further increased. Thus, there remains the need for improvement in view of ensuring a passenger compartment space as widely as possible. Moreover, in the arrangement where the exhaust gas-purifying unit is provided inside the tunnel portion, a traveling wind produced by traveling of a vehicle is more likely to touch the exhaust gas-purifying unit, so that it becomes difficult to quickly raise a temperature of a catalyst in the exhaust gas-purifying unit during engine warm-up. In this regard, there also remains the need for improvement.

SUMMARY OF THE INVENTION

The present invention has been made in view of the above background art. It is therefore an object of the present invention to, in an exhaust apparatus for a transverse engine, make it possible to compactly lay out an exhaust upstream section thereof including an exhaust gas-purifying unit, in an engine compartment without sacrificing a passenger compartment space, and quickly raise a temperature of a catalyst in the exhaust gas-purifying unit during engine warm-up.

In order to achieve the above object, the present invention is directed to an exhaust apparatus provided in an engine having four or more cylinders arranged in a line, wherein the engine is transversely placed in an engine compartment at a front of a vehicle to allow a cylinder arrangement direction to be oriented in a vehicle-widthwise direction. The exhaust apparatus has an exhaust upstream section coupled to a surface of the engine on a vehicle-rear side and housed in the engine compartment. The exhaust upstream section comprises: a plurality of branch pipe portions communicated with respective ones of the four or more cylinders and extending from the vehicle-rear-side surface of the engine toward the vehicle-rear side; a plurality of intermediate collector pipe portions each formed by dividing the four or more cylinders into a plurality of cylinder groups each consisting of two or more cylinders whose exhaust strokes are not successive with respect to each other, and merging the branch pipe portions communicated with respective ones of the cylinders in each of the cylinder groups, on a cylinder group-by-cylinder group basis; a final collector pipe portion formed by merging the plurality of intermediate collector pipe portions together; and an exhaust gas-purifying unit connected to an exhaust downstream end of the final collector pipe portion. The exhaust gas-purifying unit is disposed on the vehicle-rear side of the engine to allow a gas passage thereinside to extend approximately in the vehicle-widthwise direction, in top plan view. Each of the plurality of intermediate collector pipe portions curves to allow an exhaust downstream region of the intermediate collector pipe portion to be oriented toward one side or the other side of the vehicle-widthwise direction, in top plan view, and the final collector pipe portion curves to allow an exhaust downstream region of the final collector pipe portion to be oriented toward a vehicle-front side, in top plan view.

DESCRIPTION OF THE PREFERRED EMBODIMENTS

The present invention will now be specifically described based on embodiments thereof.

(First Embodiment)

Figure 1:
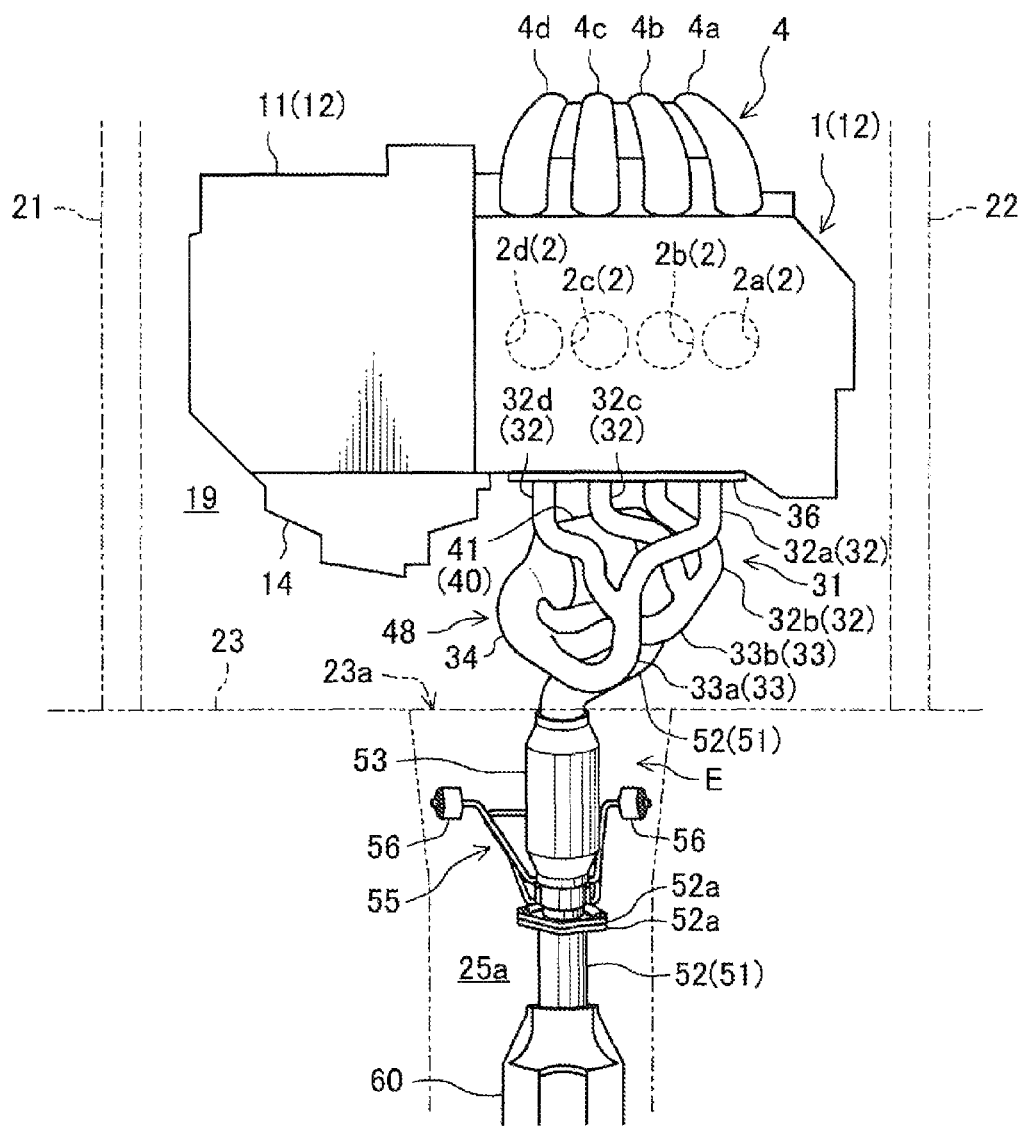
FIG. 1 is a top plan view showing a mounted state of an exhaust apparatus according to a first embodiment of the present invention, with respect to a vehicle.
Figure 2:
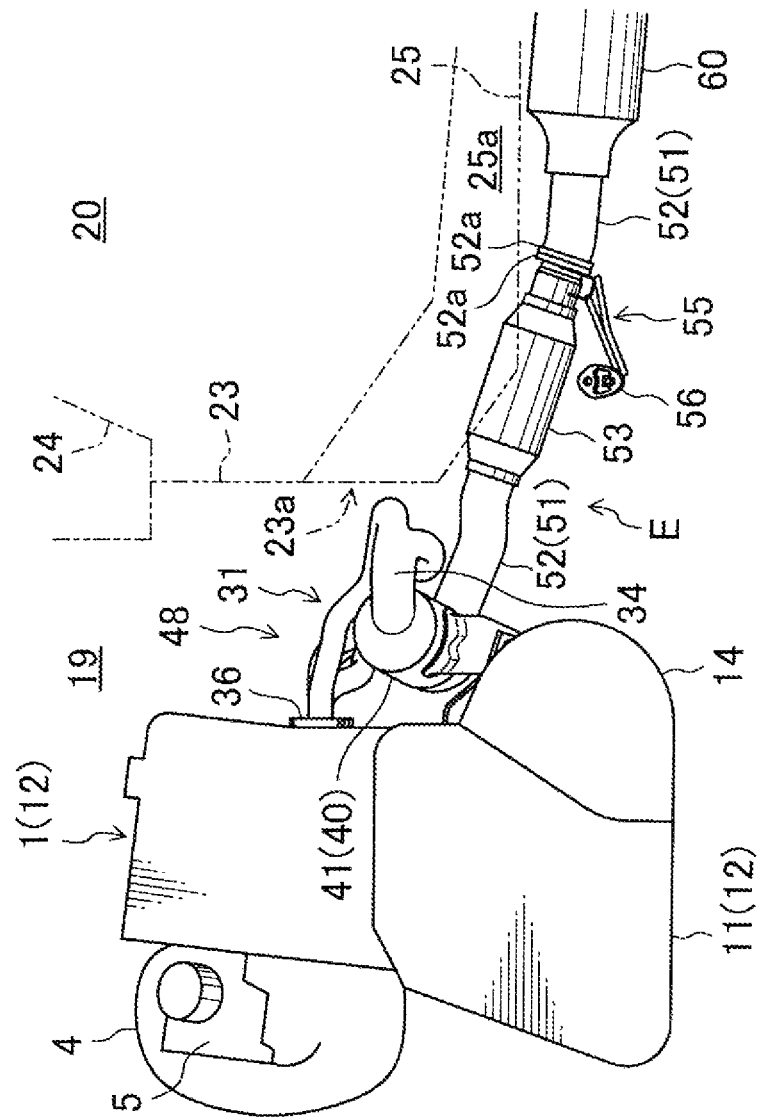
FIG. 2 is a side view showing the mounted state of the exhaust apparatus with respect to the vehicle, when viewed from a left side of the vehicle.

FIGS. 1 and 2 show an exhaust apparatus E according to a first embodiment of the present invention. The exhaust apparatus E is designed for a transverse engine 1. The engine 1 is an inline four-cylinder engine having four cylinders 2 arranged in a line, and transversely placed in an engine compartment 19 at a front of a vehicle to allow a cylinder arrangement direction to be oriented in a vehicle-widthwise direction (rightward-leftward direction in FIG. 1). In the following description, a right side of the vehicle which corresponds to a right side in FIG. 1 (reverse side of the drawing sheet of FIG. 2), a left side of the vehicle which corresponds to a left side in FIG. 1 (obverse side of the drawing sheet of FIG. 2), a front side of the vehicle which corresponds to an upper side in FIG. 1 (left side in FIG. 2), and a rear side of the vehicle which corresponds to a lower side in FIG. 1 (right side in FIG. 2), will be referred to respectively as "vehicle-right side", "vehicle-left side", "vehicle-front side", and "vehicle-rear side".

The engine 1 is disposed offset toward a vehicle-right side (right side in FIG. 1) in the engine compartment 19. Further, the engine 1 is disposed in an inclined posture to allow an axis of each of the cylinders 2 to be oriented upwardly and toward a vehicle-rear side.

The engine 1 is coupled with a transmission 11 located on one side thereof in the cylinder arrangement direction (in the first embodiment, on a vehicle-left side (left side in FIG. 1)). A combination of the engine 1 and the transmission 11 makes up a power plant 12. The transmission 11 is a transverse type having a non-illustrated input shaft and a non-illustrated output shaft each extending in the vehicle-widthwise direction. The input shaft is coupled to a crankshaft of the engine 1 extending in the vehicle-widthwise direction, and the output shaft is coupled to a differential gear mechanism 14 disposed on the vehicle-rear side of the transmission 11. Although not illustrated, right and left front wheel drive axles each coupled to a corresponding one of right and left front wheels extend from the differential gear mechanism 14 toward respective ones of opposite sides of the vehicle-widthwise direction. The vehicle is an FF (front engine, front wheel drive) vehicle in which the right and left front wheels are driven by the engine 1. It is understood that the vehicle may be a four-wheel-drive vehicle.

A left side frame 21 and a right side frame 22 are provided on respective ones of opposite sides of the power plant 12 in the vehicle-widthwise direction. Specifically, the left side frame 21 and the right side frame 22 are disposed on a left side close to the transmission 11 and on a right side close to the engine 1, respectively, to extend in an frontward-rearward direction of the vehicle (vehicle-longitudinal direction).

A vehicle-rear-side wall of the engine compartment 19 is made up of a dash panel 23 partitioning between the engine compartment 19 and a passenger compartment 20. The dash panel 23 extends in an upward-downward direction and in the vehicle-widthwise direction. An upper end of the dash panel 23 is joined to a cowl member 24, and a lower end of the dash panel 23 is joined to a front end of a floor panel 25 defining a floor surface of the passenger compartment 20.

The floor panel 25 has a tunnel portion 25a formed in a vehicle-widthwise central region thereof to bulge upwardly in a cross-sectionally generally inverted-U shape and extend in the vehicle-longitudinal direction. The dash panel 23 has a tunnel opening 23a which is a upwardly-extending cutout formed in a vehicle-widthwise central region of the lower end thereof to communicate with the tunnel portion 25a. Thus, a single exhaust pipe (after-mentioned downstream exhaust pipe 51) will pass through an inner space of the tunnel portion 25a (outside of the passenger compartment 20). When the vehicle is a four-wheel-drive vehicle, an exhaust pipe and a drive shaft for driving rear wheels will pass through the inner space of the tunnel portion 25a.

An intake manifold 4 is provided on a vehicle-front side of the engine 1 to introduce intake air into each of the cylinders 2 of the engine 1. The intake manifold 4 has four branch pipe portions 4a, 4b, 4c, 4d each connected to a respective one of four intake ports (not shown) which are communicated with respective ones of the four cylinders 2 of the engine 1 and opened on a vehicle-front-side surface of the engine 1. The branch pipe portions 4a to 4d are curvedly formed to surround a surge tank 5 extending in the cylinder arrangement direction (vehicle-widthwise direction).

Figure 3:
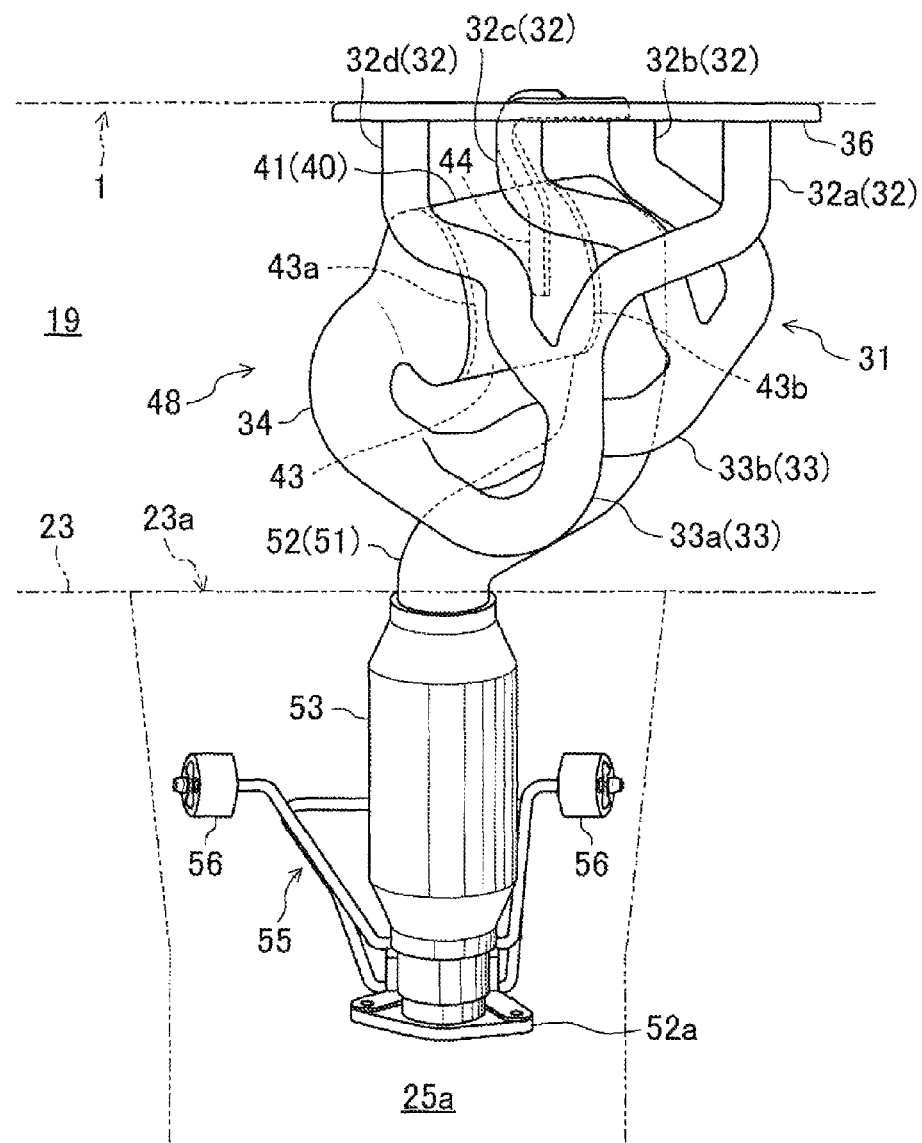
FIG. 3 is a top plan view showing an exhaust upstream section, and an upstreammost one of a plurality of divided pipe members of a downstream exhaust pipe, in the exhaust apparatus.
Figure 4:
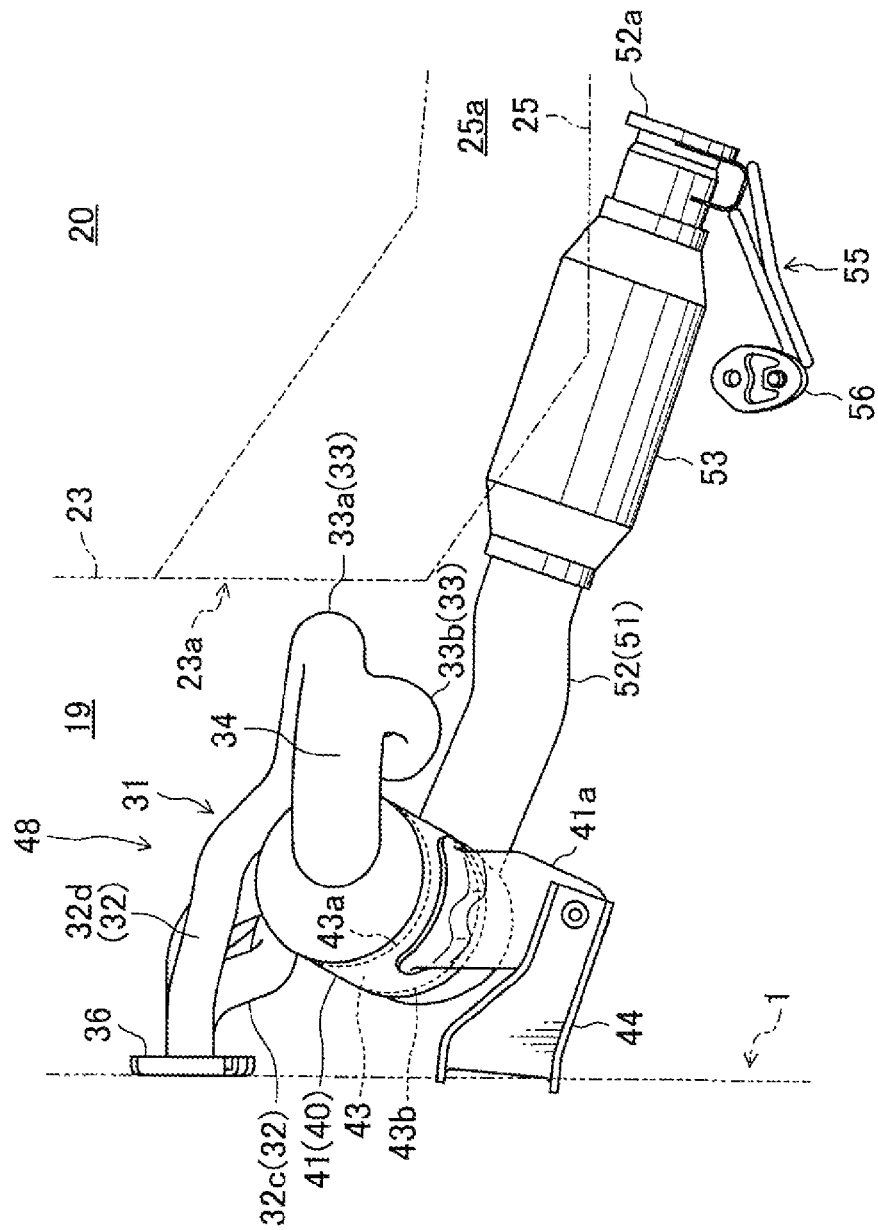
FIG. 4 is a side view showing the exhaust upstream section, and the upstreammost pipe member of the downstream exhaust pipe, in the exhaust apparatus, when viewed from the left side of the vehicle.
Figure 5:
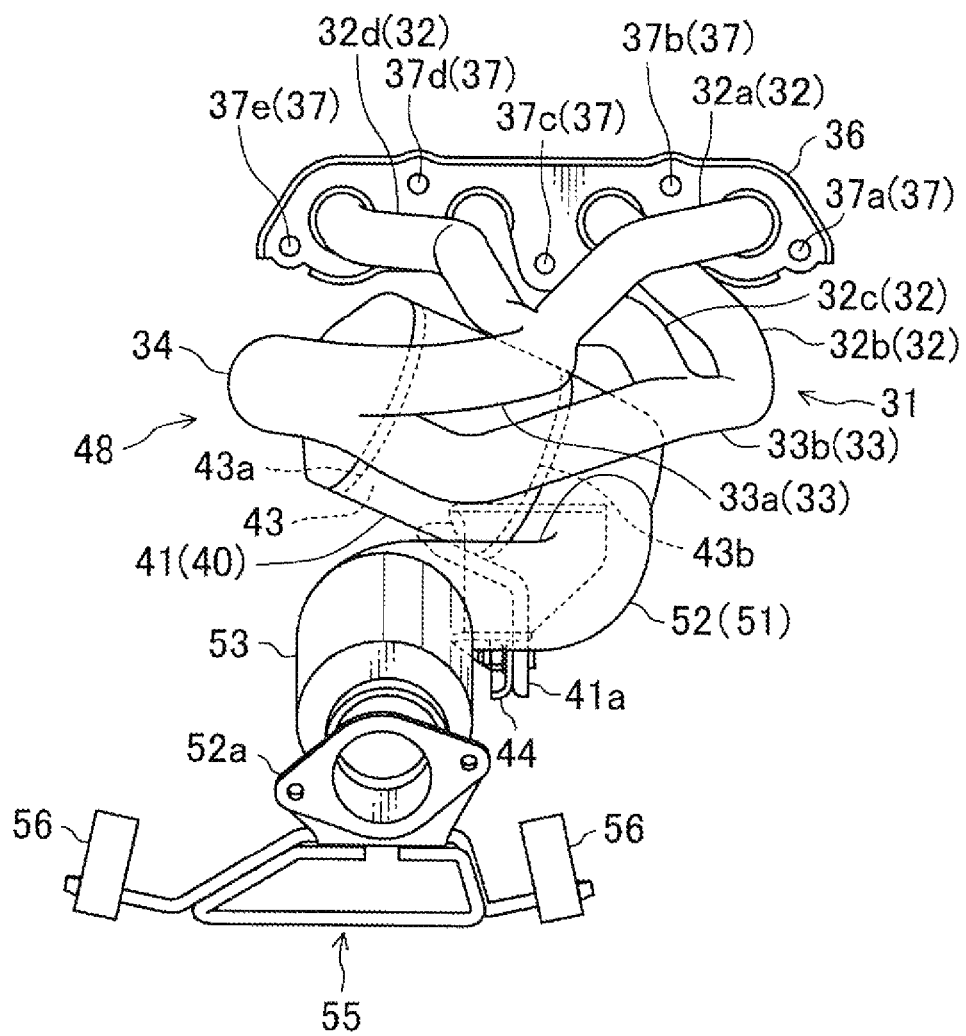
FIG. 5 is a view showing the exhaust upstream section, and the upstreammost pipe member of the downstream exhaust pipe, in the exhaust apparatus, when viewed from a rear side of the vehicle.

The exhaust apparatus E is provided on the vehicle-rear side of the engine 1 to discharge exhaust gas produced in each of the cylinders 2 of the engine 1. With reference to FIGS. 3 to 5, details of the exhaust apparatus E will be specifically described below.

The exhaust apparatus E comprises an exhaust manifold 31, a manifold catalytic converter 40 as a unit for purifying exhaust gas of the engine 1 (exhaust gas-purifying unit), and a downstream exhaust pipe 51, which are arranged in this order from an exhaust upstream side (upstream side of an exhaust gas stream). A combination of the exhaust manifold 31 and the manifold catalytic converter 40 makes up an exhaust upstream section 48 of the exhaust apparatus E. The exhaust upstream section 48 is housed in the engine compartment 19.

The exhaust manifold 31 includes four branch pipe portions 32 communicated with respective ones of the four cylinders 2 of the engine 1, two intermediate collector pipe portions 33 each formed by merging two of the four branch pipe portions 32 together, and a single final collector pipe portion 34 formed by merging the two intermediate collector pipe portions 33 together. The manifold catalytic converter 40 is connected to an exhaust downstream end of the final collector pipe portion 34.

In the following description, the four cylinders 2 will be referred to respectively as "first cylinder 2a", "second cylinder 2b", "third cylinder 2c" and "fourth cylinder 2d", in order from the side opposite to the transmission 11 (vehicle-right side) toward the transmission 11 (vehicle-left side). When it is not necessary to distinguish between them in this manner, they will be referred to simply as "cylinders 2" on a case-by-case basis. Further, the branch pipe portions 32 communicated with respective ones of the first to fourth cylinders 2a to 2d will be referred to respectively as "first branch pipe portion 32a", "second branch pipe portion 32b", "third branch pipe portion 32c" and "forth branch pipe portion 32d". When it is not necessary to distinguish between them in this manner, they will be referred to simply as "branch pipe portions 32" on a case-by-case basis.

An exhaust upstream end of each of the first to fourth branch pipe portions 32a to 32d is connected to a surface of the engine 1 on the vehicle-rear side through a flange portion 36 provided to be shared by all of the branch pipe portions 32a to 32d and extending in the vehicle-widthwise direction. Specifically, the flange portion 36 is attached to the vehicle-rear-side surface of the engine 1 to allow the exhaust upstream ends of the first to fourth branch pipe portions 32a to 32d to be connected to respective ones of four exhaust ports (not shown) opened on the vehicle-rear-side surface of the engine 1, through the flange portion 36, so that the first to fourth branch pipe portions 32a to 32d are communicated with respective ones of the first to fourth cylinders 2a to 2d.

The flange portion 36 has a plurality of (in the first embodiment, five) fastening points 37 each adapted to be fastened to the vehicle-rear-side surface of the engine 1 by a fastening member such as a bolt. Each of the fastening points 37 is formed as a through-hole for allowing the fastening member such as a bolt to be inserted thereinto. In the following description, the five fastening points 37 will be referred to respectively as "first fastening point 37a", "second fastening point 37b", "third fastening point 37c", "fourth fastening point 37d" and "fifth fastening point 37e", in order from the vehicle-right side. When it is not necessary to distinguish between them in this manner, they will be referred to simply as "fastening points 37" on a case-by-case basis.

The first fastening point 37a is provided in the flange portion 36 at a position corresponding to a region on a vehicle-widthwise outer side (vehicle-right side) of the first cylinder 2a. The second fastening point 37b is provided in the flange portion 36 at a position corresponding to a region between the first cylinder 2a and the second cylinder 2b, and the third fastening point 37c is provided in the flange portion 36 at a position corresponding to a region between the second cylinder 2b and the third cylinder 2c. The fourth fastening point 37d is provided in the flange portion 36 at a position corresponding to a region between the third cylinder 2c and the fourth cylinder 2d, and the fifth fastening point 37e is provided in the flange portion 36 at a position corresponding to a region on a vehicle-widthwise outer side (vehicle-left side) of the fourth cylinder 2d. The first to fifth fastening points 37a to 37e are arranged such that two lines each connecting a part of the fastening points extend in the vehicle-widthwise direction (cylinder arrangement direction) in spaced-apart relation to each other in a heightwise direction. The upper fastening point line including the second and fourth fastening points 37b, 37d is located at a first height position adjacent to an upper edge of the flange portion 36, and the lower fastening point line including the first, third and fifth fastening points 37a, 37c, 37e is located at a second height position adjacent to a lower edge of the flange portion 36. Thus, each of the second and fourth fastening points 37b, 37d corresponds to a high-position fastening point provided at the first height position, and each of the first, third and fifth fastening points 37a, 37c, 37e corresponds to a low-position fastening point provided at the second height position below the first height position. Further, the first to fifth fastening points 37a to 37e are arranged in a zigzag pattern to allow each of the fastening points 37 on the upper line to be located in a corresponding one of two regions between adjacent ones of the fastening points 37 on the lower line.

Each of the intermediate collector pipe portions 33 is formed by dividing the four cylinders 2 into two cylinder groups each consisting of two cylinders 2 whose exhaust strokes (expansion strokes) are not successive with respect to each other, and merging the branch pipe portions 32 communicated with respective ones of the two cylinders 2 in each of the cylinder groups, on a cylinder group-by-cylinder group basis. In the first embodiment, the exhaust stroke occurs in the following order: the first cylinder 2a→the third cylinder 2c→the fourth cylinder 2d→the second cylinder 2b. Thus, the four cylinders 2 are divided into a cylinder group consisting of the first cylinder 2a and the fourth cylinder 2d, and a cylinder group consisting of the second cylinder 2b and the third cylinder 2c. Then, the first and fourth branch pipe portions 32a, 32d communicated with respective ones of the first and fourth cylinders 2a, 2d are merged together to form one of the intermediate collector pipe portions 33, and the second and third branch pipe portions 32b, 32c communicated with respective ones of the second and third cylinders 2b, 2c are merged together to form the other intermediate collector pipe portion 33. In the following description, the intermediate collector pipe portion 33 formed by merging the first and fourth branch pipe portions 32a, 32d together will be referred to as "first intermediate collector pipe portion 33a", and the intermediate collector pipe portion 33 formed by merging the second and third branch pipe portions 32b, 32c together will be referred to as "second intermediate collector pipe portion 33b". When it is not necessary to distinguish between them in this manner, they will be referred to simply as "intermediate collector pipe portions 33" on a case-by-case basis.

Each of the first to fourth branch pipe portions 32a to 32d extends from the vehicle-rear-side surface of the engine 1 (in a strict sense, from the flange portion 36), basically toward the vehicle-rear side. More specifically, in top plan view, the first branch pipe portion 32a extends from the vehicle-rear-side surface of the engine 1 toward the vehicle-rear side, and then extends obliquely toward the vehicle-rear side with an inclination toward the vehicle-left side. In top plan view, the fourth branch pipe portion 32d extends from the vehicle-rear-side surface of the engine 1 toward the vehicle-rear side, and then extends obliquely toward the vehicle-rear side with an inclination toward the vehicle-right side. Then, the first branch pipe portion 32a and the fourth branch pipe portion 32d are merged together at approximately the same vehicle-widthwise position as that of the third fastening point 37c, and the first intermediate collector pipe portion 33a is formed on an exhaust downstream side of the merging position. Further, in top plan view, the second branch pipe portion 32b extends from the vehicle-rear-side surface of the engine 1 toward the vehicle-rear side, and then extends obliquely toward the vehicle-rear side with an inclination toward the vehicle-right side. Then, just before the second intermediate collector pipe portion 33b, the second branch pipe portion 32b curves toward the opposite side and extends obliquely toward the vehicle-rear side with an inclination toward the vehicle-left side. In top plan view, the third branch pipe portion 32c extends from the vehicle-rear-side surface of the engine 1 toward the vehicle-rear side, and then extends obliquely toward the vehicle-rear side with an inclination toward the vehicle-right side. Then, the second branch pipe portion 32b and the third branch pipe portion 32c are merged together at approximately the same vehicle-widthwise position as that of the second fastening point 37b, and the second intermediate collector pipe portion 33b is formed on the exhaust downstream side of the merging position. Each of the second and third branch pipe portions 32b, 32c extends from the vehicle-left side toward the vehicle-right side of the first branch pipe portion 32a, while passing across a region just below the first branch pipe portion 32a.

In the first embodiment, respective exhaust upstream ends of the first and second intermediate collector pipe portions 33a, 33b (the merging position of the first and fourth branch pipe portions 32a, 32d, and the merging position of the second and third branch pipe portions 32b, 32c) are disposed offset with respect to each other in the vehicle-widthwise direction. Specifically, an exhaust upstream end of the first intermediate collector pipe portion 33a (the merging position of the first and fourth branch pipe portions 32a, 32d) is located on the vehicle-left side of (on the side of the transmission 11 with respect to) an exhaust upstream end of the second intermediate collector pipe portion 33b (the merging position of the second and third branch pipe portions 32b, 32c). A height position of the exhaust upstream end of the first intermediate collector pipe portion 33a is approximately equal to a height position of the exhaust upstream end of the second intermediate collector pipe portion 33b (in a strict sense, slightly above a height position of the exhaust upstream end of the second intermediate collector pipe portion 33b), and located below the third fastening point 37c. This arrangement makes it possible to keep an area around each of the fastening points 37 (particularly, the third fastening point 37c) of the flange portion 36 and a region just above the area from overlapping the branch pipe portions 32 and the intermediate collector pipe portions 33, when viewed from the vehicle-rear side, as shown in FIG. 5. Thus, a space for a fastening operation at each of the fastening points 37 (particularly, the third fastening point 37c) can be ensured to allow a fastening member to be set in each area around the fastening points 37 from above the engine 1, which makes it easy to perform the fastening operation.

The first and second intermediate collector pipe portions 33a, 33b are merged together while curving to allow respective exhaust downstream regions of the first and second intermediate collector pipe portions 33a, 33b to be oriented toward one side of the vehicle-widthwise direction (in the first embodiment, toward the vehicle-left side, i.e., toward the transmission 11), in top plan view, and the final collector pipe portion 34 is formed on the exhaust downstream side of the merging position of the first and second intermediate collector pipe portions 33a, 33b. Specifically, the first intermediate collector pipe portion 33a extends from the exhaust upstream end thereof toward the vehicle-rear side, and then curves toward the vehicle-left side, and the second intermediate collector pipe portion 33b curves toward the vehicle-left side directly from the exhaust upstream end thereof, and extends toward the vehicle-left side while passing across a region just below the exhaust upstream end of the first intermediate collector pipe portion 33a. Then, the first and second intermediate collector pipe portions 33a, 33b are merged together at approximately the same position as that of the fourth cylinder in the vehicle-widthwise direction (at a portion near a vehicle-widthwise central region of the engine compartment 19) to form the final collector pipe portion 34.

The final collector pipe portion 34 is connected to the manifold catalytic converter 40 while curving to allow an exhaust downstream region of the final collector pipe portion 34 to be oriented toward the vehicle-front side, in top plan view. The exhaust downstream region of the final collector pipe portion 34 curves toward the vehicle-front side with an inclination toward the vehicle-right side, and the final collector pipe portion 34 has an intermediate region formed in a curved shape which is convexed toward a side opposite to the manifold catalytic converter 40 (toward the vehicle-left side) with respect to both ends of the final collector pipe portion 34. The exhaust downstream end of the final collector pipe portion 34 is increased in diameter to have the same diameter as that of an after-mentioned casing 41 of the manifold catalytic converter 40, and connected to an exhaust upstream end surface of the casing 41 (a left end surface of the casing 41 on the vehicle-left side).

The manifold catalytic converter 40 is disposed on the vehicle-rear side of the engine 1, and disposed to allow a gas passage inside the casing 41 to extend approximately in the vehicle-widthwise direction, in top plan view. Thus, the casing 41 extends approximately along the vehicle-rear-side surface of the engine 1. In the first embodiment, in a strict sense, the casing 41 (gas passage) is inclined to be gradually shifted toward the vehicle-rear side by a slight distance as going toward the vehicle-left side (exhaust upstream side). This is intended to allow a gas entry angle with respect to an exhaust upstream end surface 43a of a catalyst installation portion 43 to be set as close as possible to 90 degrees, as described later. Further, the casing 41 (gas passage) is inclined to be gradually shifted downwardly by a slight distance as going toward the vehicle-right side (exhaust downstream side). This is because the downstream exhaust pipe 51 is located just below the second and third branch pipe portions 32b, 32c and the second intermediate collector pipe portion 33b, i.e., intended to avoid interference with these portions (32b, 32c, 33b).

The manifold catalytic converter 40 is formed by installing a catalyst in a gas passage inside an generally cylindrical-shaped casing 41. A catalyst installation portion 43 in the gas passage inside the casing 41 has a generally circular shape in cross-section. Each of an exhaust upstream end surface 43a (vehicle-left-side end surface) and an exhaust downstream end surface 43b (vehicle-right-side end surface) of the catalyst installation portion 43 is located in substantially the same plane as that of a corresponding one of an exhaust upstream end surface and an exhaust downstream end surface of the casing 41, or located slightly inward of the casing 41. Although the catalyst is a three-way catalyst, it is designed particularly to purify HC and CO during warm-up of the engine 1. For this purpose, the manifold catalytic converter 40 is provided in the exhaust upstream section 48 of the exhaust apparatus E. It is understood that the cross-sectional shape of the catalyst installation portion 43 is not limited to the generally circular shape.

In the first embodiment, the manifold catalytic converter 40 is supported with respect to the vehicle-rear-side surface of the engine 1. Specifically, a protruding member 41a is fixed to the casing 41 to protrude downwardly, and a support member 44 having a generally inverted-L shape when viewed from thereabove is provided between the protruding member 41a and the vehicle-rear-side surface of the engine 1, so that the manifold catalytic converter 40 is supported by the vehicle-rear-side surface of the engine 1 through the support member 44. The support of the manifold catalytic converter 40 with respect to the engine 1 is not indispensable.

The downstream exhaust pipe 51 is connected to the exhaust downstream end surface (vehicle-right-side end surface) of the casing 41 of the manifold catalytic converter 41. The downstream exhaust pipe 51 is disposed to extend from a connection portion thereof with the manifold catalytic converter 40 (exhaust upstream end thereof), toward the tunnel opening 23a formed in the vehicle-widthwise central region of the lower end of the dash panel 23. Specifically, in top plan view, the downstream exhaust pipe 51 curves toward the vehicle-rear side at the exhaust upstream end thereof and extends toward the vehicle-rear side. Then, the downstream exhaust pipe 51 extends obliquely toward the vehicle-rear side with an inclination toward the vehicle-left side (toward a vehicle-widthwise central region of the engine compartment 19). Then, when the downstream exhaust pipe 51 reaches a position in front of the tunnel opening 23a, it extends toward the vehicle-rear side, and enters the tunnel portion 25a from the tunnel opening 23a. The downstream exhaust pipe 51 is comprised of a plurality of divided pipe members 52 formed by dividing the downstream exhaust pipe 51 into a plurality of pieces along a length direction thereof. Adjacent two of the pipe members 52 are connected together through two flanges 52a formed at respective connection ends of the adjacent pipe members 52. In FIGS. 1 and 2, only an upstreammost one of the pipe members 52 and a part of the pipe member 52 located immediately on the exhaust downstream side of the upstreammost pipe member 52 are illustrated, and the illustration of the remaining pipe members 52 is omitted. Further, in FIGS. 3 to 5, only the upstreammost pipe member 52 is illustrated.

The exhaust downstream region of the final collector pipe portion 34 protrudes toward the vehicle-left side with respect to the exhaust upstream end surface 43a of the catalyst installation portion 43 of the manifold catalytic converter 40, and an exhaust upstream region of the downstream exhaust pipe 51 protrudes toward the vehicle-right side with respect to the exhaust downstream end surface 43b of the catalyst installation portion 43. Further, a maximum vehicle-widthwise protruding amount of the final collector pipe portion 34 with respect to the exhaust upstream end surface 43a of the catalyst installation portion 43 is set to be greater than a maximum vehicle-widthwise protruding amount of the downstream exhaust pipe 51 with respect to the exhaust downstream end surface 43b of the catalyst installation portion 43, to allow a gas entry angle with respect to the exhaust upstream end surface 43a of the catalyst installation portion 43 to become greater than a gas discharge angle with respect to the exhaust downstream end surface 43b of the catalyst installation portion 43. Specifically, the exhaust downstream region of the final collector pipe portion 34 is configured to reduce an inclination with respect to an extension direction of the casing 41 (catalyst installation portion 43) and largely extend in the extension direction of the casing 41 (catalyst installation portion 43), as compared with the exhaust upstream region of the downstream exhaust pipe 51, to allow the gas entry angle with respect to the exhaust upstream end surface 43a of the catalyst installation portion 43 to be set as close as possible to 90 degrees so as to cause exhaust gas entering the catalyst installation portion 43 to be uniformly dispersed over the entire cross-section of the catalyst installation portion 43.

The upstreammost pipe member 52 of the downstream exhaust pipe 51 has a flexible joint 53. The flexible joint 53 is located inside the tunnel portion 25a, and designed to absorb vibration of the engine 1 and vibration of the exhaust upstream section 48 caused by the vibration of the engine 1 so as to prevent the vibrations from being transmitted to a region on the exhaust downstream side of the flexible joint 53. The number of the flexible joints 53 is not limited to one, but a plurality of the flexible joints 53 may be provided in series at intervals along the length direction of the downstream exhaust pipe 51 (see an after-mentioned third embodiment).

The upstreammost pipe member 52 is supported with respect to a vehicle body (floor panel 25) of the vehicle through a portion thereof located on the exhaust downstream side of the flexible joint 53. Specifically, an elongate rod-shaped support member 55 is bent into a generally trapezoidal shape, in top plan view. An upper side of the support member 55 is fixed to a vicinity of the flange 52a of the upstreammost pipe member 52. Each of opposite ends of a lower side of the trapezoidal-shaped support member 55 is formed to protrude outwardly in the vehicle-widthwise direction, and a distal end of each of the protruding portions is attached to the floor panel 25 through an elastic member 56. In cases where a plurality of the flexible joints 53 are provided in the upstreammost pipe member 52, the upstreammost pipe member 52 may be supported with respect to the vehicle body through a portion thereof located on the exhaust downstream side of a downstreammost one of the flexible joints 53.

The pipe member 52 immediately on the exhaust downstream side of the upstreammost pipe member 52 is provided with an underfoot catalytic converter 60 having a structure similar to that of the manifold catalytic converter 40. Although a catalyst of the underfoot catalytic converter 60 is a three-way catalyst as with the manifold catalytic converter 40, it is designed to primarily purify NOx. The pipe member 52 provided with the underfoot catalytic converter 60 is supported with respect to the vehicle body (floor panel 25) by a support structure similar to that for the upstreammost pipe member 52.

In the first embodiment, the branch pipe portions 32, the intermediate collector pipe portions 33, the final collector pipe portion 34 and the manifold catalytic converter 40 which constitute the exhaust upstream section 48 of the exhaust apparatus E are formed in a loop shape turning in a clockwise direction toward the exhaust downstream side, in top plan view, so that the exhaust upstream section 48 including the manifold catalytic converter 40 can be compactly laid out on the vehicle-rear side of the engine 1, while increasing a length of each of the branch pipe portions 32 and the intermediate collector pipe portions 33 to enhance exhaust efficiency. In addition, even if the length of each of the branch pipe portions 32 and the intermediate collector pipe portions 33 is increased, the tunnel portion 25a is required to allow only the single downstream exhaust pipe 51 to pass therethrough, so that there is no need to increase a cross-sectional area of the tunnel portion 25a, which makes it possible to prevent a space of the passenger compartment 20 from being narrowed.

In this case, there is a possibility that the exhaust upstream section 48 formed in a loop shape brings an disadvantage in terms of exhaust resistance, as compared with a straight shape. However, as long as a diameter of the loop is not excessively reduced, a problem of the exhaust resistance practically does not occur, but it becomes possible to increase an output power of the engine 1 based on the exhaust efficiency-enhancing effect obtained by increasing the length of each of the branch pipe portions 32 and the intermediate collector pipe portions 33.

Further, the manifold catalytic converter 40 is disposed adjacent to the vehicle-rear-side surface of the engine 1, so that a traveling wind produced by traveling of the vehicle becomes less likely to touch the manifold catalytic converter 40, which makes it possible to more quickly raise a temperature of the catalyst of the manifold catalytic converter 40 during warm-up of the engine 1.

Furthermore, the manifold catalytic converter 40 having a large weight is disposed adjacent to the engine 1, so that vibration of the exhaust upstream section 48 to be caused by vibration of the engine 1 can be reduced, as compared with an arrangement where the manifold catalytic converter 40 is disposed away from the engine 1. In the first embodiment, the manifold catalytic converter 40 is supported with respect to the vehicle-rear-side surface of the engine 1, so that the exhaust upstream section 48 can be stably supported to further reduce the vibration of the exhaust upstream section 48 to be caused by the vibration of the engine 1.

In addition, the exhaust upstream ends of the first and second intermediate collector pipe portions 33a, 33b are disposed offset with respect to each other in the vehicle-widthwise direction, so that it becomes possible to keep the branch pipe portions 32 from being located just above the exhaust upstream ends of the first and second intermediate collector pipe portions 33a, 33b. Further, the exhaust upstream end of the final collector pipe portion 34 (the merging position of the first and second intermediate collector pipe portions 33a, 33b) is also disposed offset with respect to the exhaust upstream ends of the first and second intermediate collector pipe portions 33a, 33b in the vehicle-widthwise direction, so that any component of the exhaust apparatus E is not located just above all of the exhaust upstream ends. Thus, welding between corresponding ones of the branch pipe portions 32 and the intermediate collector pipe portions 33, and welding between each of the intermediate collector pipe portions 33 and the final collector pipe portion 34, can be performed all together so as to increase productivity.

(Second Embodiment)

Figure 6:
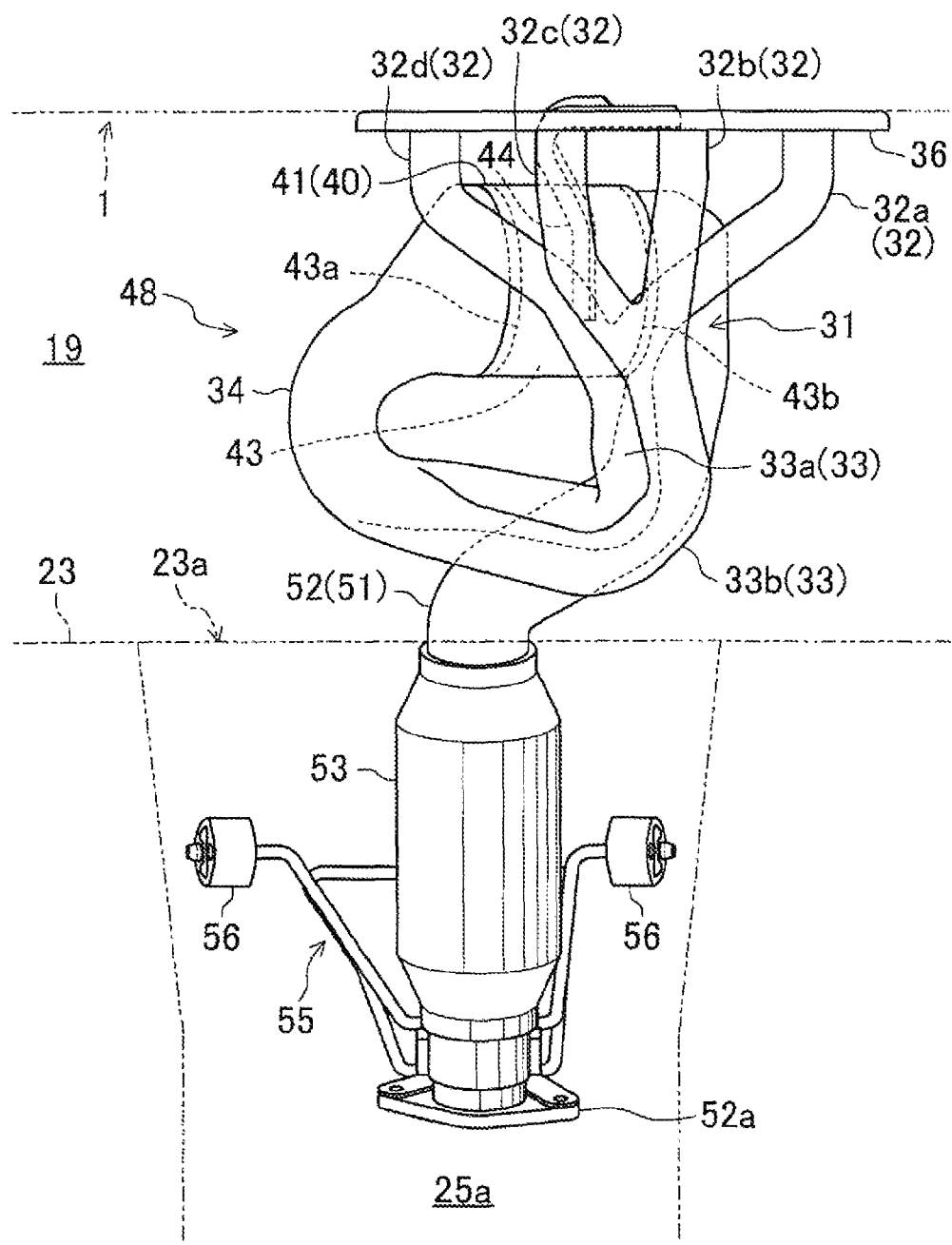
FIG. 6 is a view corresponding to FIG. 3, illustrating a second embodiment of the present invention.
Figure 7:
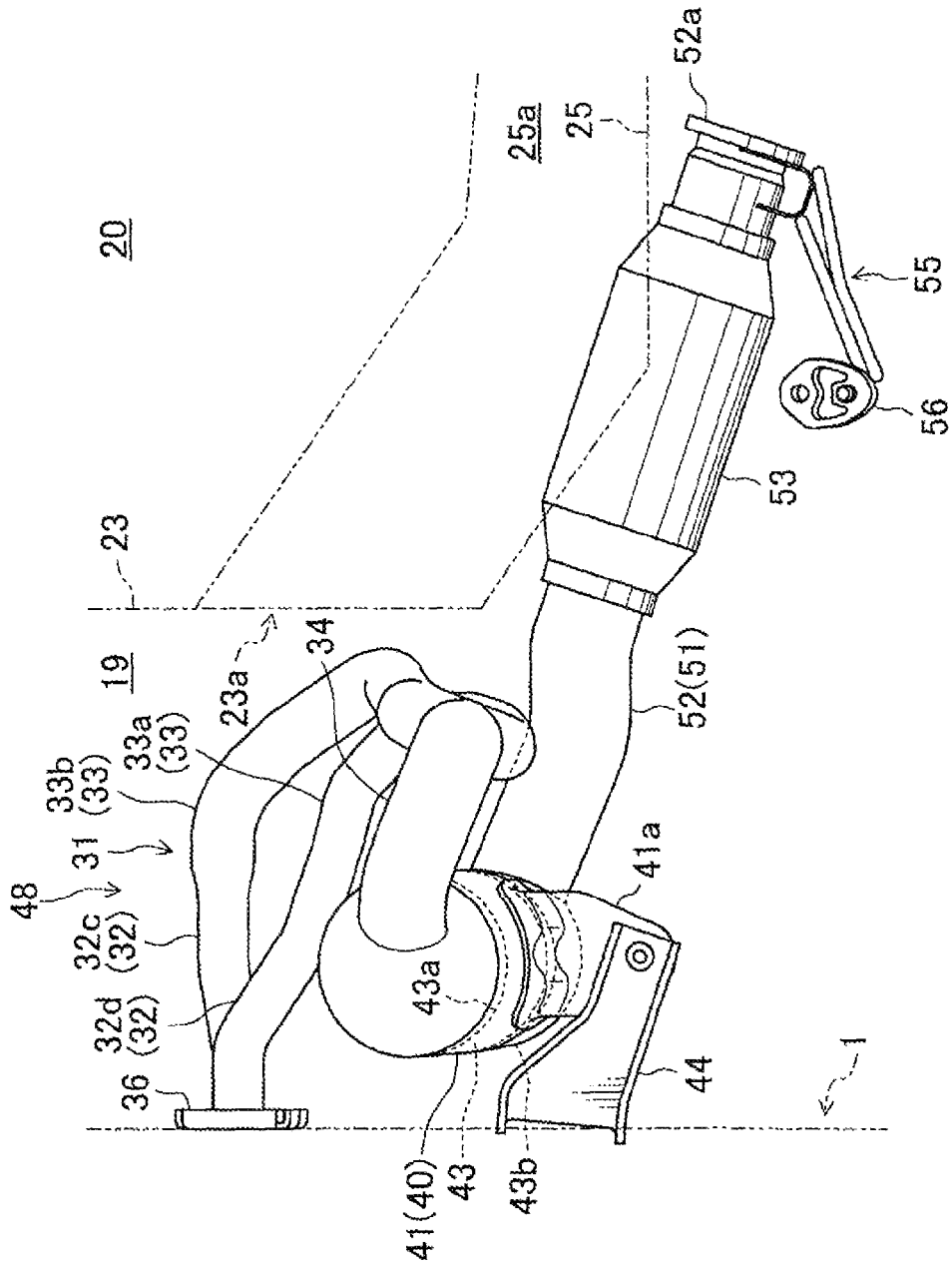
FIG. 7 is a view corresponding to FIG. 4, illustrating the second embodiment.
Figure 8:
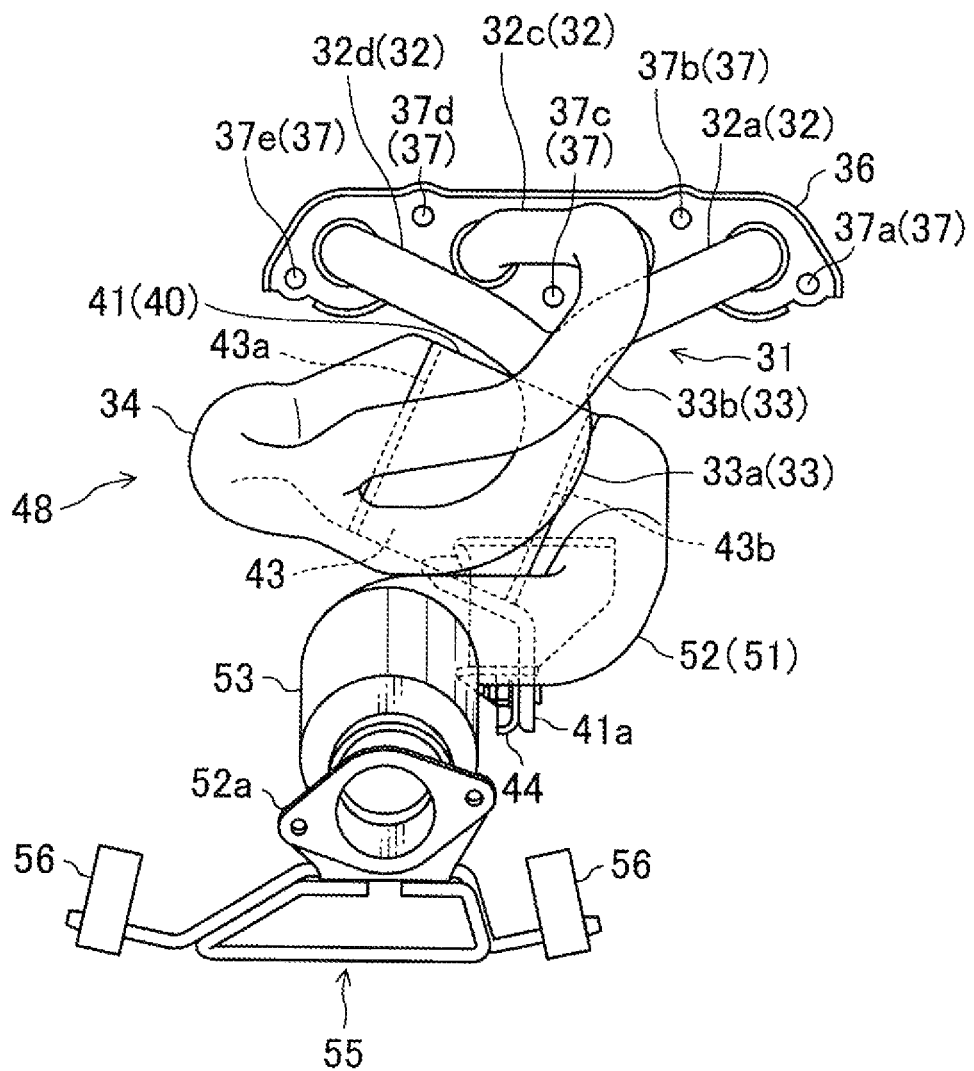
FIG. 8 is a view corresponding to FIG. 5, illustrating the second embodiment.

FIGS. 6 to 8 show an exhaust apparatus E according to a second embodiment of the present invention, wherein a positional relationship between respective exhaust upstream ends of first and second intermediate collector pipe portions 33a, 33b (a merging position of first and fourth branch pipe portions 32a, 32d, and a merging position of second and third branch pipe portions 32b, 32c) is defined differently from that in the first embodiment.

Specifically, in the second embodiment, the exhaust upstream ends of the first and second intermediate collector pipe portions 33a, 33b are disposed at approximately the same position as that of a third fastening point 37c of a flange portion 36 in the vehicle-widthwise direction, and in offset relation to each other in an upward-downward direction. More specifically, the first branch pipe portion 32a and the fourth branch portion 32d are merged in the same manner as that in the first embodiment, whereas the second branch pipe portion 32b and the third branch portion 32c extend from the vehicle-rear-side surface of the engine 1 toward the vehicle-rear side, and then come close to each other so that they are merged together at approximately the same position as that of the third fastening point 37c in the vehicle-widthwise direction. Further, the exhaust upstream end of the first intermediate collector pipe portion 33a is located just below the exhaust upstream end of the second intermediate collector pipe portion 33b, i.e., the exhaust upstream ends of the first and second intermediate collector pipe portions 33a, 33b overlap each other, in top plan view. A height position of the exhaust upstream end of the first intermediate collector pipe portion 33a is located below the third fastening point 37c as with the first embodiment, whereas a height position of the exhaust upstream end of the second intermediate collector pipe portion 33b is located above the third fastening point 37c. This makes it possible to keep an area around the third fastening point 37c of the flange portion 36 from overlapping the branch pipe portions 32 and the intermediate collector pipe portions 33, when viewed from the vehicle-rear side, as shown in FIG. 8. Thus, the fastening operation at the third fastening point 37c can be performed from the vehicle-rear side. However, a region just above the area around the third fastening point 37c of the flange portion 36 overlaps the third branch pipe portion 32c when viewed from the vehicle-rear side, and thereby it becomes difficult to perform an operation of setting a fastening member in the area around the third fastening point 37c from above the engine 1. Thus, efficiency of the fastening operation is slightly inferior to that in the first embodiment. On the other hand, an area around each of the remaining fastening points 37 (37a, 37b, 37d, 37e) of the flange portion 36 other than the third fastening point 37c and a region just above the area do not overlap the branch pipe portions 32 and the intermediate collector pipe portions 33 when viewed from the vehicle-rear side. Thus, the fastening operation at each of the remaining fastening points 37 other than the third fastening point 37c can be performed with the same efficiency as that in the first embodiment.

The first and second intermediate collector pipe portions 33a, 33b are merged together while curving to allow respective exhaust downstream regions of the first and second intermediate collector pipe portions 33a, 33b to be oriented toward one side of the vehicle-widthwise direction (toward the vehicle-left side, i.e., toward the transmission 11), in top plan view. Specifically, the first and second intermediate collector pipe portions 33a, 33b extend from the respective exhaust upstream ends thereof toward the vehicle-rear side and then curve and extend toward the vehicle-left side, in overlapping relation to each other, in top plan view. Then, the first and second intermediate collector pipe portions 33a, 33b are merged together at approximately the same position as that of the fourth cylinder 2d in the vehicle-widthwise direction, and a final collector pipe portion 34 is formed on the exhaust downstream side of the merging position.

A configuration and an arrangement of each of a power plant 12, the final collector pipe portion 34, a manifold catalytic converter 40 and a downstream exhaust pipe 51 are the same as those in the first embodiment. By way of exception, in the second embodiment, a casing 41 (gas passage) is not inclined toward the vehicle-rear side as going toward the vehicle-left side, differently from the first embodiment. This is because a maximum vehicle-widthwise protruding amount of the final collector pipe portion 34 with respect to an exhaust upstream end surface 43a of a catalyst installation portion 43 is set to a value greater than that in the first embodiment, and thereby the gas entry angle with respect to the exhaust upstream end surface 43a of the catalyst installation portion 43 can be set as close as possible to 90 degrees without inclining the casing 41 toward the vehicle-rear side as going toward the vehicle-left side.

As above, in the second embodiment, the branch pipe portions 32, the intermediate collector pipe portions 33, the final collector pipe portion 34 and the manifold catalytic converter 40 which constitute an exhaust upstream section 48 of the exhaust apparatus E are formed in a loop shape, in top plan view, as with the first embodiment, so that the same functions/effects as those in the first embodiment can be obtained.

In addition, the exhaust upstream ends of the first and second intermediate collector pipe portions 33a, 33b overlap each other, in top plan view, so that respective curvature radii of the first and second intermediate collector pipe portions 33a, 33b can be set to approximately the same and relatively large values, by effectively utilizing a space in an upward-downward direction.

(Third Embodiment)

Figure 9:
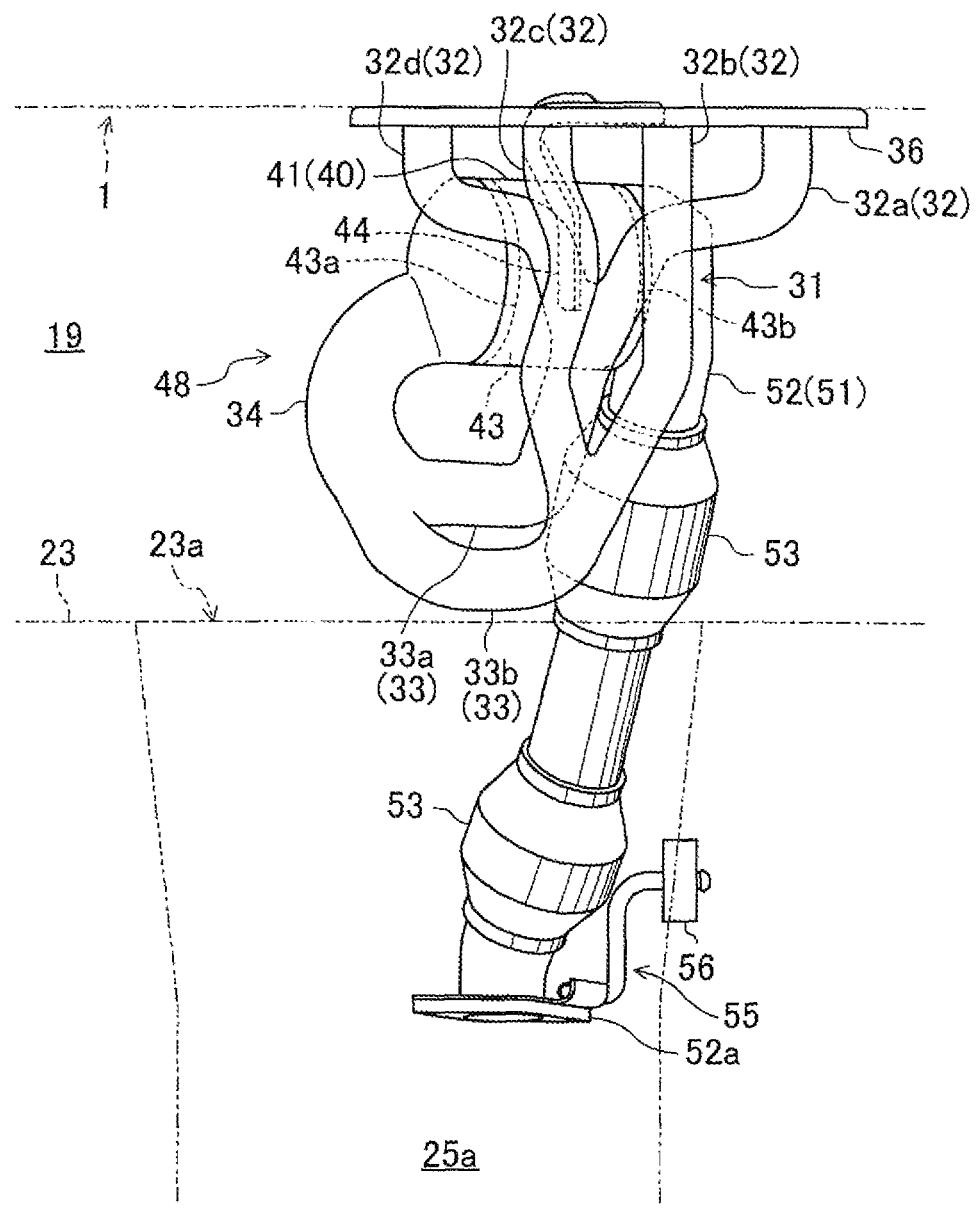
FIG. 9 is a view corresponding to FIG. 3, illustrating a third embodiment of the present invention.
Figure 10:
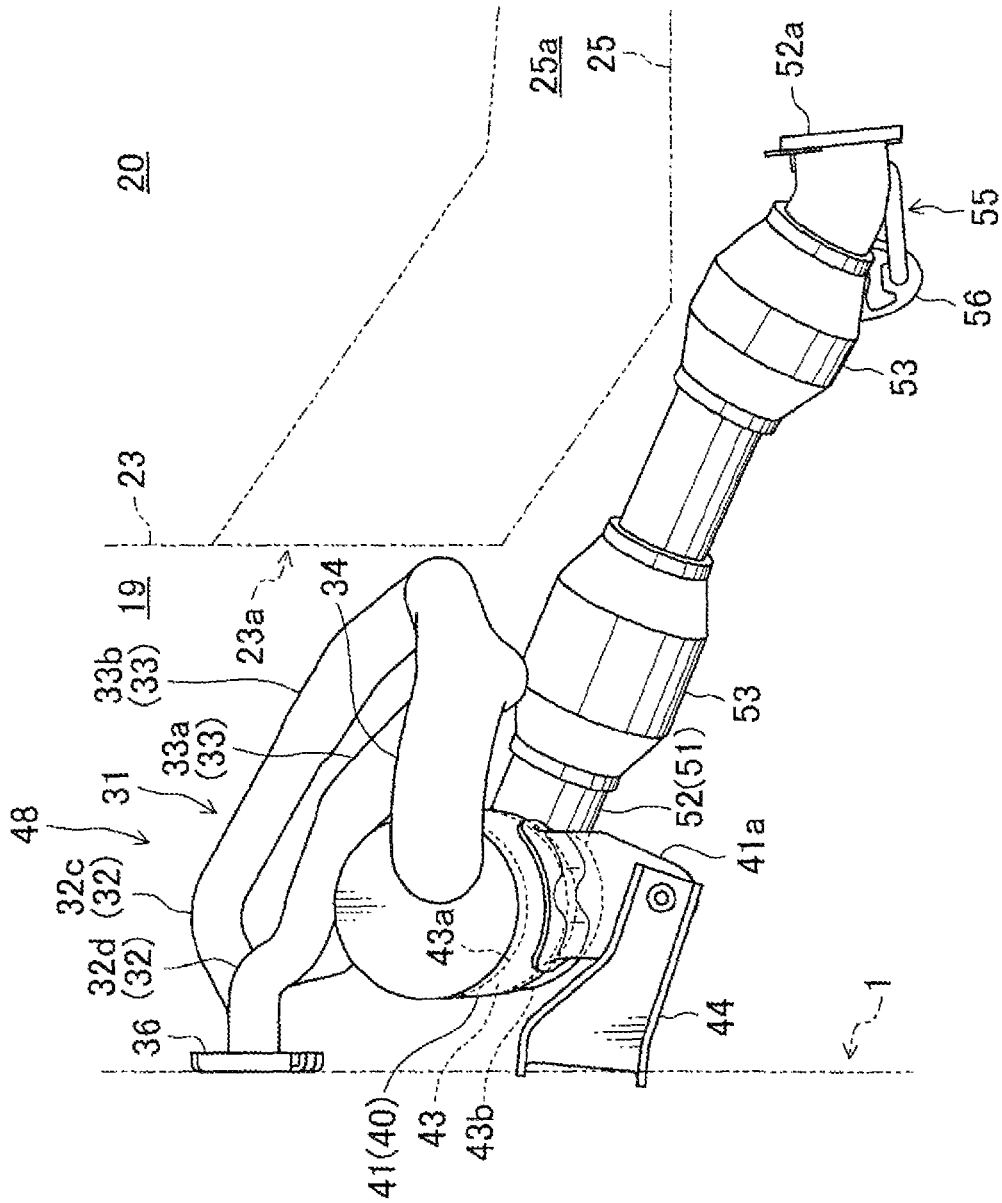
FIG. 10 is a view corresponding to FIG. 4, illustrating the third embodiment.
Figure 11:
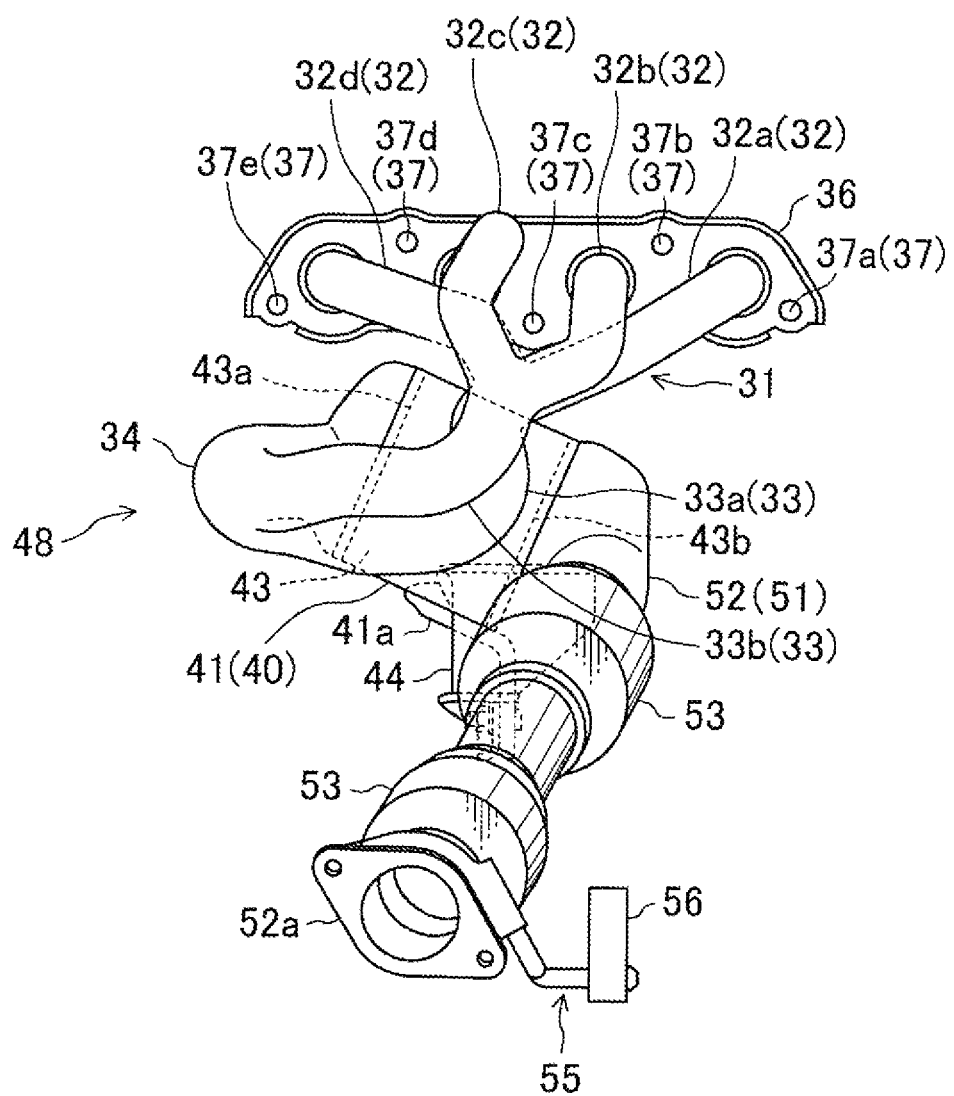
FIG. 11 is a view corresponding to FIG. 5, illustrating the third embodiment.

FIGS. 9 to 11 show an exhaust apparatus E according to a third embodiment of the present invention, wherein a positional relationship between respective exhaust upstream ends of first and second intermediate collector pipe portions 33a, 33b (a merging position of first and fourth branch pipe portions 32a, 32d, and a merging position of second and third branch pipe portions 32b, 32c) is defined differently from those in the first and second embodiments.

Specifically, in the third embodiment, the exhaust upstream ends of the first and second intermediate collector pipe portions 33a, 33b are disposed at approximately the same position as that of a third fastening point 37c of a flange portion 36 in the vehicle-widthwise direction, as with the second embodiment. However, the exhaust upstream ends of the first and second intermediate collector pipe portions 33a, 33b are offset with respect to each other in the vehicle-longitudinal direction, instead of overlapping each other, in top plan view. More specifically, a length of each of the second and third branch pipe portions 32b, 32c in the vehicle-longitudinal direction is set to be greater than a length of each of the first and fourth branch pipe portions 32a, 32d in the vehicle-longitudinal direction, and the exhaust upstream end of the second intermediate collector pipe portion 33b (the merging position of the second and third branch pipe portions 32b, 32c) is located on the vehicle-rear side of the exhaust upstream end of the first intermediate collector pipe portion 33a (the merging position of the first and fourth branch pipe portions 32a, 32d). Further, a height position of the exhaust upstream end of the second intermediate collector pipe portion 33b is approximately equal to a height position of the exhaust upstream end of the first intermediate collector pipe portion 33a, and located below the third fastening point 37c. This makes it possible to keep an area around the third fastening point 37c of the flange portion 36 and a region just above the area from overlapping the branch pipe portions 32 and the intermediate collector pipe portions 33, as well as the remaining fastening points 37 (37a, 37b, 37d, 37e), when viewed from the vehicle-rear side, as shown in FIG. 11.

Alternatively, the height position of the exhaust upstream end of the second intermediate collector pipe portion 33b may be set in the same manner as that in the second embodiment, i.e., may be set to be located above the third fastening point 37c. Even in this case, there is a possibility of being able to efficiently perform the operation of setting a fastening member in the area around the third fastening point 37c from above the engine 1, because the exhaust upstream end of the second intermediate collector pipe portion 33b is located further toward the vehicle-rear side, as compared with the second embodiment. However, in view of enhancing the efficiency of the fastening operation, it is basically more preferable that the exhaust upstream end of the second intermediate collector pipe portion 33b is set at a position below the third fastening point 37c.

The first and second intermediate collector pipe portions 33a, 33b are merged together while curving to allow respective exhaust downstream regions of the first and second intermediate collector pipe portions 33a, 33b to be oriented toward one side of the vehicle-widthwise direction (toward the vehicle-left side, i.e., toward the transmission 11), in top plan view. Specifically, the first intermediate collector pipe portion 33a extends from the exhaust upstream end thereof toward the vehicle-rear side. Then, the first intermediate collector pipe portion 33a curves toward the vehicle-left side at a position just below the exhaust upstream end of the second intermediate collector pipe portion 33b, and extends toward the vehicle-left side. The second intermediate collector pipe portion 33b curves toward the vehicle-left side directly from the exhaust upstream end thereof, and extends toward the vehicle-left side while passing through a region on the vehicle-rear side of the first intermediate collector pipe portion 33a. Then, the first and second intermediate collector pipe portions 33a, 33b are merged together at approximately the same position as that of the fourth cylinder 2d in the vehicle-widthwise direction, to form a final collector pipe portion 34.

A configuration and an arrangement of each of a power plant 12, the final collector pipe portion 34 and a manifold catalytic converter 40 are the same as those in the first or second embodiment.

In the third embodiment, a downstream exhaust pipe 51 curves toward the vehicle-rear side at an exhaust upstream end thereof. Then, the downstream exhaust pipe 51 extends obliquely toward the vehicle-rear side with an inclination toward the vehicle-left side (toward the vehicle-widthwise central region of the engine compartment 19), and enters the tunnel portion 25a while maintaining the inclination. Then, the downstream exhaust pipe 51 is disposed to pass through a region of the tunnel portion 25a on the vehicle-right side. Further, a support member 55 and an elastic member 56 are provided only on the vehicle-right side of the downstream exhaust pipe 51. The above arrangement is intended to ensure a space (on the vehicle-left side) for allowing a drive shaft for driving rear wheels to pass therethrough, so as to make it possible to promptly change over to the vehicle into a four-wheel-drive vehicle, even if it is an FF vehicle. Thus, in the changeover to a four-wheel-drive vehicle, the drive shaft can be provided without modifying the downstream exhaust pipe 51, the support member 55, etc.

In the third embodiment, an upstreammost one of a plurality of divided pipe members 52 of the downstream exhaust pipe 51 has two flexible joints 53 arranged in series at intervals along a length direction of the downstream exhaust pipe 51 (upstreammost pipe member 52). An exhaust downstream one of the flexible joints 53 is disposed inside the tunnel portion 25a, whereas the other of exhaust upstream flexible joint 53 is disposed inside the engine compartment 19.

As above, in the third embodiment, the branch pipe portions 32, the intermediate collector pipe portions 33, the final collector pipe portion 34 and the manifold catalytic converter 40 which constitute an exhaust upstream section 48 of the exhaust apparatus E are formed in a loop shape, in top plan view, as with the first embodiment, so that the same functions/effects as those in the first embodiment can be obtained.

Although each of the first to third embodiments has been described by taking an exhaust apparatus E for an inline four-cylinder engine 1 as an example, the number of cylinders of the engine 1 is not limited to four, but may be five or more. Further, depending on the number of cylinders of the engine 1, the number of the intermediate collector pipe portions 33 (i.e., the number of the cylinder groups) may be increased to three or more, and the number of the branch pipe portions 32 to be merged to form one of the intermediate collector pipe portions 33 (i.e., the number of cylinders comprised in one of the cylinder groups) may be increased to three or more.

In the first to third embodiments, the intermediate collector pipe portions 33 are configured to curve to allow the exhaust downstream regions of the intermediate collector pipe portions 33 to be oriented toward one side of the vehicle-widthwise direction (toward the transmission 11), in top plan view. Alternatively, the intermediate collector pipe portions 33 may be configured to curve to allow the exhaust downstream regions of the intermediate collector pipe portions 33 to be oriented toward the other side of the vehicle-widthwise direction (toward a side opposite to the transmission 11), in top plan view. In this case, when respective positions of the engine 1 and the transmission 11 in the rightward-leftward direction are the same as those in the first to third embodiments, the exhaust upstream section 48 is formed in a loop shape turning in a counterclockwise direction toward the exhaust downstream side, in top plan view. Specifically, each of the intermediate collector pipe portions 33 curves to allow the exhaust downstream region of the intermediate collector pipe portion 33 to be oriented toward the vehicle-right side, in top plan view, and the final collector pipe portion 34 curves to allow the exhaust downstream region of the final collector pipe portion 34 to be oriented toward the vehicle-front side, in top plan view. Further, the manifold catalytic converter 40 is disposed in a posture where the exhaust upstream end thereof is oriented toward the vehicle-right side and the exhaust downstream end thereof is oriented toward the vehicle-left side, and the downstream exhaust pipe 51 is connected to the exhaust downstream end of the manifold catalytic converter 40 (on the vehicle-left side).

At the last of the description, features of the present invention disclosed based on the above embodiments and advantages thereof will be summarized.

The present invention is directed to an exhaust apparatus provided in an engine having four or more cylinders arranged in a line, wherein the engine is transversely placed in an engine compartment at a front of a vehicle to allow a cylinder arrangement direction to be oriented in a vehicle-widthwise direction. The exhaust apparatus has an exhaust upstream section coupled to a surface of the engine on a vehicle-rear side and housed in the engine compartment. The exhaust upstream section comprises: a plurality of branch pipe portions communicated with respective ones of the four or more cylinders and extending from the vehicle-rear-side surface of the engine toward the vehicle-rear side; a plurality of intermediate collector pipe portions each formed by dividing the four or more cylinders into a plurality of cylinder groups each consisting of two or more cylinders whose exhaust strokes are not successive with respect to each other, and merging the branch pipe portions communicated with respective ones of the cylinders in each of the cylinder groups, on a cylinder group-by-cylinder group basis; a final collector pipe portion formed by merging the plurality of intermediate collector pipe portions together; and an exhaust gas-purifying unit connected to an exhaust downstream end of the final collector pipe portion. The exhaust gas-purifying unit is disposed on the vehicle-rear side of the engine to allow a gas passage thereinside to extend approximately in the vehicle-widthwise direction, in top plan view. Each of the plurality of intermediate collector pipe portions curves to allow an exhaust downstream region of the intermediate collector pipe portion to be oriented toward one side or the other side of the vehicle-widthwise direction, in top plan view, and the final collector pipe portion curves to allow an exhaust downstream region of the final collector pipe portion to be oriented toward a vehicle-front side, in top plan view.

In the exhaust apparatus of the present invention, the branch pipe portions, the intermediate collector pipe portions, the final collector pipe portion and the exhaust gas-purifying unit which constitute the exhaust upstream section are formed in a loop shape, in top plan view, so that the exhaust upstream section including the exhaust gas-purifying unit can be compactly laid out on the vehicle-rear side of the engine, while increasing a length of each of the branch pipe portions and the intermediate collector pipe portions to enhance exhaust efficiency. In addition, even if the length of each of the branch pipe portions and the intermediate collector pipe portions is increased, a tunnel portion is required to allow only a single downstream exhaust pipe to pass therethrough, so that there is no need to increase a cross-sectional area of the tunnel portion.

In the above exhaust apparatus, there is a possibility that the exhaust upstream section formed in a loop shape brings an disadvantage in terms of exhaust resistance, as compared with a straight shape. However, as long as a diameter of the loop is not excessively reduced, a problem of the exhaust resistance practically does not occur, but it becomes possible to increase an output power of the engine based on the exhaust efficiency-enhancing effect obtained by increasing the length of each of the branch pipe portions and the intermediate collector pipe portions.

Further, the exhaust upstream section formed in a loop shape makes it possible to distribute an elongation of the exhaust upstream section caused by thermal expansion, over the entire loop, so as to prevent degradation of the exhaust upstream section due to stress concentration.

Further, the exhaust gas-purifying unit can be disposed adjacent to the vehicle-rear-side surface of the engine, so that a traveling wind produced by traveling of the vehicle becomes less likely to touch the exhaust gas-purifying unit, which makes it possible to more quickly raise a temperature of a catalyst in the exhaust gas-purifying unit during warm-up of the engine.

Furthermore, the exhaust gas-purifying unit having a large weight is disposed adjacent to the engine, so that vibration of the exhaust upstream section to be caused by vibration of the engine can be reduced, as compared with an arrangement where the exhaust gas-purifying unit is disposed away from the engine.

Preferably, the exhaust apparatus of the present invention further comprises a downstream exhaust pipe connected to an exhaust downstream end of the exhaust gas-purifying unit, wherein the exhaust gas-purifying unit is supported with respect to the vehicle-rear-side surface of the engine, and the downstream exhaust pipe has a flexible joint interposed therein, and wherein the downstream exhaust pipe is supported with respect to a vehicle body of the vehicle through a portion thereof located on an exhaust downstream side of the flexible joint.

In the above exhaust apparatus where the exhaust gas-purifying unit is supported with respect to the engine, the exhaust upstream section including the exhaust gas-purifying unit can be stably supported to further reduce the vibration of the exhaust upstream section to be caused by the vibration of the engine. Although a region of the exhaust apparatus upstream of the flexible joint vibrates together with the engine, the vibration is absorbed by the flexible joint, so that it becomes possible to prevent the vibration from being transmitted to a region located on the exhaust downstream side of the flexible joint and fixed to the vehicle body.

Preferably, in the exhaust apparatus of the present invention, respective exhaust upstream ends of the plurality of intermediate collector pipe portions are disposed offset with respect to each other in the vehicle-widthwise direction.

According to this feature, the branch pipe portions and the intermediate collector pipe portions can be desirably arranged in terms of productivity. Specifically, it becomes possible to keep the branch pipe portions from being located just above the exhaust upstream end of each of the intermediate collector pipe portions (merging position of the two or more branch pipe portions), and thereby perform welding between corresponding ones of the branch pipe portions and the intermediate collector pipe portions all together.

In the exhaust apparatus of the present invention, respective exhaust upstream ends of the plurality of intermediate collector pipe portions may be disposed offset with respect to each other in an upward-downward direction.

According to this feature, a curvature radius of each of the intermediate collector pipe portions can be set to a relatively large value, by effectively utilizing a space in the upward-downward direction.

Preferably, in the above exhaust apparatus, the exhaust upstream ends of the plurality of intermediate collector pipe portions are disposed to overlap each other, in top plan view.

According to this feature, respective curvature radii of all of the intermediate collector pipe portions can be set to approximately the same and relatively large values.

Preferably, in the above exhaust apparatus, each of the plurality of branch pipe portions is connected to the vehicle-rear-side surface of the engine through a single flange portion shared by all of the branch pipe portions, wherein the flange portion extends in the vehicle-widthwise direction and has a plurality of fastening points adapted to be fastened onto the vehicle-rear-side surface of the engine by a fastening member, and wherein the plurality of fastening points include a high-position fastening point provided at a first height position and a low-position fastening point provided at a second height position below the first height position, and wherein each of the exhaust upstream ends of the plurality of intermediate collector pipe portions is disposed at a position below the low-position fastening point.

According to this feature, it becomes possible to ensure a space for a fastening operation at each of the fastening points (particularly, the low-position fastening point) so as to smoothly perform the fastening operation.

This application is based on Japanese Patent application No. 2009-274195 filed in Japan Patent Office on Dec. 2, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An exhaust apparatus provided in an engine having four or more cylinders arranged in a line, wherein the engine is transversely placed in an engine compartment at a front of a vehicle to allow a cylinder arrangement direction to be oriented in a vehicle-widthwise direction, the exhaust apparatus having an exhaust upstream section coupled to a surface of the engine on a vehicle-rear side and housed in the engine compartment, wherein the exhaust upstream section comprises:

a plurality of branch pipe portions communicated with respective ones of the four or more cylinders and extending from the vehicle-rear-side surface of the engine toward the vehicle-rear side;

a plurality of intermediate collector pipe portions each formed by dividing the four or more cylinders into a plurality of cylinder groups each consisting of two or more cylinders whose exhaust strokes are not successive with respect to each other, and merging the branch pipe portions communicated with respective ones of the cylinders in each of the cylinder groups, on a cylinder group-by-cylinder group basis;

a final collector pipe portion formed by merging the plurality of intermediate collector pipe portions together; and an exhaust gas-purifying unit connected to an exhaust downstream end of the final collector pipe portion, and wherein:

the exhaust gas-purifying unit is disposed on the vehicle-rear side of the engine and at a position below the branch pipe portions to allow a gas passage thereinside to extend approximately in the vehicle-widthwise direction, in top plan view;

the gas passage of the exhaust gas-purifying unit is inclined downwardly as going toward an exhaust downstream side;

each of the plurality of intermediate collector pipe portions curves to allow an exhaust downstream region of the intermediate collector pipe portion to be oriented toward one side or the other side of the vehicle-widthwise direction, in top plan view, the intermediate collector pipe portions being disposed in offset relation to each other in an upward-downward direction; and the final collector pipe portion curves to allow an exhaust downstream region of the final collector pipe portion to be oriented toward a vehicle-front side, in top plan view.

2. The exhaust apparatus as defined in claim 1, further comprising a downstream exhaust pipe connected to an exhaust downstream end of the exhaust gas-purifying unit, and wherein:

the exhaust gas-purifying unit is supported with respect to the vehicle-rear-side surface of the engine; and the downstream exhaust pipe has a flexible joint interposed therein, the downstream exhaust pipe being supported with respect to a vehicle body of the vehicle through a portion thereof located on an exhaust downstream side of the flexible joint.

3. The exhaust apparatus as defined in claim 2, wherein respective exhaust upstream ends of the plurality of intermediate collector pipe portions are disposed offset with respect to each other in the vehicle-widthwise direction.

4. The exhaust apparatus as defined in claim 2, wherein the plurality of intermediate collector pipe portions extend toward one side or the other side of the vehicle-widthwise direction in overlapping relation to each other, in top plan view.

5. The exhaust apparatus as defined in claim 4, wherein the exhaust upstream ends of the plurality of intermediate collector pipe portions are disposed to overlap each other, in top plan view.

6. The exhaust apparatus as defined in claim 3, wherein:

each of the plurality of branch pipe portions is connected to the vehicle-rear-side surface of the engine through a single flange portion shared by all of the branch pipe portions;

the flange portion extends in the vehicle-widthwise direction and has a plurality of fastening points adapted to be fastened onto the vehicle-rear-side surface of the engine by a fastening member;

the plurality of fastening points include a high-position fastening point provided at a first height position and a low-position fastening point provided at a second height position below the first height position; and each of the exhaust upstream ends of the plurality of intermediate collector pipe portions is disposed at a position below the low-position fastening point.

7. The exhaust apparatus as defined in claim 1, wherein respective exhaust upstream ends of the plurality of intermediate collector pipe portions are disposed offset with respect to each other in the vehicle-widthwise direction.

8. The exhaust apparatus as defined in claim 1, wherein the plurality of intermediate collector pipe portions extend toward one side or the other side of the vehicle-widthwise direction in overlapping relation to each other, in top plan view.

9. The exhaust apparatus as defined in claim 7, wherein:

each of the plurality of branch pipe portions is connected to the vehicle-rear-side surface of the engine through a single flange portion shared by all of the branch pipe portions;

the flange portion extends in the vehicle-widthwise direction and has a plurality of fastening points adapted to be fastened onto the vehicle-rear-side surface of the engine by a fastening member;

the plurality of fastening points include a high-position fastening point provided at a first height position and a low-position fastening point provided at a second height position below the first height position; and each of the exhaust upstream ends of the plurality of intermediate collector pipe portions is disposed at a position below the low-position fastening point.

\* \* \* \* \*